United States Patent [19]

Nogami

[11] 4,085,978
[45] Apr. 25, 1978

[54] VEHICULAR HYDRAULIC BRAKE APPARATUS

[75] Inventor: Tomoyuki Nogami, Toyota, Japan

[73] Assignee: Toyota Jidosha Kogyo Kabushiki Kaisha, Toyota, Japan

[21] Appl. No.: 793,758

[22] Filed: May 4, 1977

[30] Foreign Application Priority Data

Nov. 24, 1976 Japan .................... 51-140928

[51] Int. Cl.² ............................................ B60T 8/04
[52] U.S. Cl. .................................. 303/6 C; 60/563;
60/570; 60/591; 188/349; 303/24 C; 303/24 F
[58] Field of Search ............... 303/24 C, 24 F, 6 C;
188/349; 60/563, 570, 591

[56] References Cited

U.S. PATENT DOCUMENTS

| 3,147,045 | 9/1964 | Stelzer | 303/24 F |
|-----------|--------|---------|----------|
| 3,727,989 | 4/1973 | Keady | 188/349 |
| 3,790,221 | 2/1974 | Fulmer | 303/6 C |
| 3,944,292 | 3/1976 | Doi | 303/24 C |

*Primary Examiner*—Trygve M. Blix
*Assistant Examiner*—Reinhard J. Eisenzopf
*Attorney, Agent, or Firm*—Cushman, Darby & Cushman

[57] ABSTRACT

A vehicular hydraulic brake apparatus comprises a tandem master cylinder having front and rear sections respectively connected by independent front and rear wheel braking hydraulic circuits to front and rear wheel brake cylinders. The rear wheel braking hydraulic circuit is provided therein with a deceleration-responsive braking pressure control device having pressure inlet and outlet normally communicated with each other. The pressure control device has an inertia valve comprising a ball and a valve seat and a first differential piston both disposed between the pressure inlet and outlet. When the deceleration of an associated vehicle reaches a predetermined value, the ball is moved to close the valve for thereby interrupting the communication between the pressure inlet and outlet. In normal operative condition of the apparatus, the differential piston is operative to modulate the inlet pressure after the valve closure and transmit the modulated pressure to the rear wheel brake cylinders. The pressure control device has a second piston having opposite ends exposed to hydraulic pressures in the front and rear wheel braking hydraulic circuits, respectively, so that when a failure should occur in the front wheel braking hydraulic circuit, the second piston is moved in a direction by the pressure in the rear wheel braking hydraulic circuit. The second piston has a cam which forces a plunger into locking engagement with the first piston against movement at least in upstream direction, whereby the hydraulic pressure produced in the rear section of the tandem master cylinder is not consumed for upstream movement of the first differential piston but can be used solely to actuate pistons in the rear wheel brake cylinders.

10 Claims, 5 Drawing Figures

VEHICULAR HYDRAULIC BRAKE APPARATUS

BACKGROUND OF THE INVENTION

1. Field of the Invention

The present invention relates generally to a vehicular hydraulic brake apparatus and, more particularly, to a vehicular hydraulic brake apparatus of the type that has a tandem master cylinder having front and rear sections connected through independent front and rear wheel braking hydraulic circuits to front and rear wheel brake cylinders, respectively, and a deceleration-responsive braking pressure control device.

2. Background of the Invention

A vehicular hydraulic brake apparatus of the type referred to is disclosed, for example, in U.S. Pat. No. 3,771,835. The brake apparatus comprises a tandem master cylinder, a front wheel braking hydraulic circuit connecting a front section of the master cylinder to front wheel brake cylinders, a rear wheel braking hydraulic circuit connecting a rear section of the master cylinder to rear wheel brake cylinders, and a deceleration-responsive braking pressure control device provided in the rear wheel braking hydraulic circuit. The braking pressure control device has pressure inlet and outlet between which is provided a deceleration-responsive valve operative to interrupt the communication between the inlet and outlet when the deceleration of an associated vehicle reaches a predetermined level. The pressure control device also has a differential piston having a first pressure-receiving area upon which acts the hydraulic pressure in the pressure inlet and a second pressure-receiving area which is larger than said first pressure-receiving area and upon which acts the hydraulic pressure in the pressure outlet.

In the case where both front and rear hydraulic circuits operate without fail, the deceleration-responsive valve is closed when a brake pedal is actuated until the vehicle is decelerated to a predetermined deceleration. Thereafter, if the brake pedal is continuously actuated, the hydraulic pressure in the pressure inlet of the hydraulic pressure control device (input pressure) continuously increases and acts on the first pressure-receiving area. As a result, the differential piston is forced toward the pressure outlet. Since the second pressure-receiving area of the differential piston is larger than the first pressure-receiving area, the hydraulic pressure at the pressure outlet of the hydraulic pressure control device (output pressure) increases at a rate which is dependent upon the ratio of the first pressure-receiving area to the second pressure-receiving area. The rate of the pressure increase is thus smaller than the rate of the output pressure increase obtained prior to the closing of the deceleration-responsive valve. It is well known in the art that this output pressure increase characteristic is suitable for rear wheel brakes.

In case where the brake liquid leaks from the front wheel braking hydraulic circuit due to damage thereof, the deceleration of the vehicle must rely solely on the rear wheel brakes (this condition is called "rear partial".). As a result, a large quantity of brake fluid must be forced into the rear wheel brake cylinders. In this case, since the deceleration-responsive valve is not closed before the deceleration of the vehicle reaches the predetermined value, the flow of brake fluid into the rear wheel brake cylinders will not be interrupted until the deceleration reaches the predetermined value. When the hydraulic pressure in the rear wheel braking hydraulic circuit rises beyond a predetermined magnitude, the force acting on the second pressure-receiving area of the differential piston exceeds the force acting on the first pressure-receiving area so that the differential piston is caused to move in the upstream direction, i.e., toward the pressure inlet of the pressure control device. This means that a part of one complete stroke of the brake pedal is consumed for the displacement of the differential piston toward the pressure inlet of the pressure control device, but not for driving the pistons in the rear wheel brake cylinders. In other words, a part of the flow of the brake fluid produced in the rear section of the tandem master cylinder is wasted without any braking force. In such an event, there is an insufficient margin left to the pedal stroke with a resultant risk that the hydraulic pressure in the rear brake cylinders is not increased sufficiently to obtain a required vehicle deceleration.

SUMMARY OF THE INVENTION

In view of the above, the present invention has its object to provide a vehicular hydraulic brake apparatus of the type described and wherein, in the event of a failure or brake liquid leakage in one of the front and rear wheel braking hydraulic circuits, the differential piston (to be referred to as "first differential piston" hereunder) in the hydraulic pressure control device can be locked against displacement at least in upstream direction, i.e., toward the pressure inlet so that the flow of the brake fluid caused by the actuation of the brake pedal may be most efficiently utilized solely for producing braking efforts.

For this purpose, the brake apparatus according to the present invention is provided with means responsive to a difference in pressure between the front and rear sections of the tandem master cylinder for locking the first differential piston against displacement at least toward the pressure inlet of the hydraulic pressure control device, whereby the hydraulic pressure produced in the rear section of the tandem master cylinder is not consumed for upstream movement of the first differential piston which would otherwise take place, but can most efficiently be used solely to actuate pistons in the rear wheel brake cylinders.

According to one preferred embodiment of the present invention, the hydraulic pressure control device is disposed in the rear wheel braking hydraulic circuit. The locking means includes a second differential piston having a first pressure-receiving area on which acts the hydraulic pressure in the rear wheel braking hydraulic circuit and a second pressure-receiving area which is larger than the first pressure receiving area and on which acts the hydraulic pressure in the front wheel braking hydraulic circuit. Cam surfaces are formed on the second differential piston. A plunger has its one end engageable by one of the cam surfaces. An abutment is formed on the first differential piston for engagement with the other end of the plunger. Under normal operations of the front and rear hydraulic circuits, the second differential piston is held stationary at a predetermined or normal position within a cylinder bore. However, if a failure should take place in one of the front and rear wheel braking hydraulic circuits, the second differential piston is forced to move in either direction by the hydraulic pressure in the other hydraulic circuit. One of the cam surfaces on the second differential piston causes the plunger to move into engagement with the abutment on the first differential piston.

The abutment in the first differential piston may be in the form of a step for engagement with the other end of the plunger to prevent the displacement of the first differential piston only toward the pressure inlet of the hydraulic pressure control device. Alternatively, the abutment may be in the form of an annular or circumferential groove for engagement with the other end of the plunger to prevent the displacement of the first piston in both directions.

According to an alternative embodiment of the invention, the second differential piston has first and second differential piston parts slidably received in first and second sections of a cylinder bore. The first and second cylinder bore sections are connected through pressure inlet ports to the master cylinder front and rear sections, respectively, and are also connected to the front and rear wheel brake cylinders through pressure outlets defined in the hydraulic pressure control device, respectively. The pressure outlets are substantially coaxial with the cylinder bore and open to the first and second cylinder bore sections, respectively, to define valve seats which are engageable by valve elements provided on the second differential piston adjacent to the opposite ends thereof when the valve elements are moved with the second differential piston. The arrangement is such that the second differential piston is movable toward the valve seat in the braking hydraulic circuit in which a leakage has occur so that the last-mentioned valve is engaged by an associated valve element to block the last-mentioned circuit.

The above and other objects, features and advantages of the invention will be made apparent by the following description with reference to the accompanying drawings.

DESCRIPTION OF PREFERRED EMBODIMENTS

Figure 1:
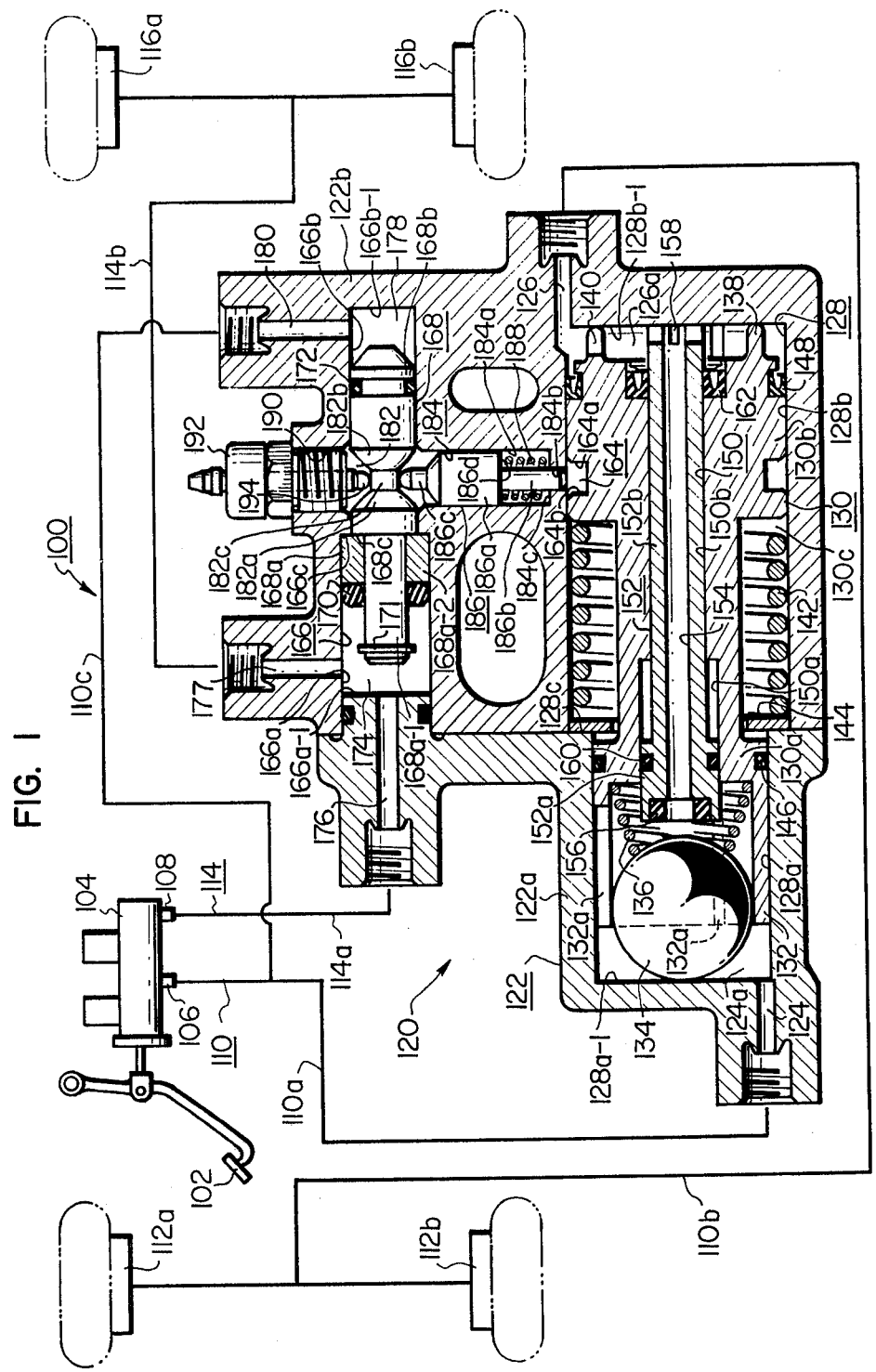
FIG. 1 is a partly diagrammatic and partly sectional view of an embodiment of the vehicular hydraulic brake apparatus according to the present invention.

In FIG. 1, there is shown a first embodiment of a vehicular hydraulic brake apparatus in accordance with the present invention. The apparatus is generally indicated by reference numeral 100 and has a conventional tandem master cylinder 104 actuated by a brake pedal 102. The master cylinder 104 incorporates independent rear and front master cylinders (not shown) communicated with rear and front outlets 106 and 108, respectively, which in turn are respectively connected with rear wheel brake cylinders 112a and 112b and front wheel brake cylinders 116a and 116b through rear and front wheel braking hydraulic circuits 110 and 114 (which will be called "rear and front hydraulic circuits," respectively, in this specification). The rear hydraulic circuit 110 comprises two conduits 110a and 110b whereas the front hydraulic circuit 114 comprises two conduits 114a and 114b. A braking hydraulic pressure control device generally indicated by reference numeral 120 is provided in the rear and front hydraulic circuits 110 and 114.

The braking hydraulic pressure control device 120 (to be called "hydraulic pressure control device" in this specification) has a housing 122 consisting of a pair of parts or sections 122a and 122b rigidly bolted together. The housing 122 has a first or rear pressure inlet 124 connected with the conduit 110a of the rear hydraulic circuit 110 and a first or rear pressure outlet 126 connected with the conduit 110b. A cylindrical and stepped first cylinder bore 128 extends axially between the pressure inlet and outlet 124 and 126. More particularly, the cylinder bore 128 has a small-diameter section 128a directly in communication with the first pressure inlet 124, a large-diameter section 128b in direct communication with the first pressure outlet 126 and a shoulder 128c provided therebetween.

Received in the first cylinder bore 128 is a first differential piston 130 having a small-diameter section 130a in slidable engagement with the small-diameter section 128a of the first cylinder bore 128a, a large-diameter section 130b in slidable engagement with the large-diameter cylinder bore section 128b and an annular groove 130c formed between the small and large-diameter sections 130a and 130b of the piston. A plurality of rod-shaped projections extend from the periphery of the end face of the small-diameter piston section 130a toward an end wall 128a-1 of the small-diameter section 128a of the first cylinder bore 128 and are equiangularly spaced apart from each other. A ball 134 is rotatably received in a substantially cylindrical space defined by the projections 132. A conical helical compression spring 136 is disposed between the ball 134 and the end face of the small-diameter section 130a of the differential piston 130 so that the ball 134 may be elastically pressed against the end wall 128a-1 of the small-diameter cylinder bore section 128a. Spaces between the projections 132 serve as passages 132a for the brake fluid under pressure.

From the end face of the large-diameter section 130b of the differential piston 130, projections 138 extend toward an end wall 128b-1 of the large-diameter cylinder bore section 128b and are circumferentially spaced apart from each other to define therebetween passages 140 for permitting the flow of brake fluid under pressure in the radial direction. A compression coil spring 142 is disposed in the annular groove 130c of the differential piston 130 with one end abutting against a spring retainer 144 axially supported by the shoulder 128c of the first cylinder bore 128, the other end of the spring 142 abutting against the large-diameter section 130b of the piston 130. The spring retainer 144 is formed of two semi-circular parts for permitting them to be placed around the differential piston 130. The force of the compression spring 142 is stronger than that of the compression spring 136. Elastic seal rings 146 and 148 are provided between the small-diameter cylinder bore and piston sections 130a and 128a and between the large-diameter cylinder bore and piston sections 130b and 128b, respectively.

The differential piston 130 is formed with a second cylinder bore 150 extending through the piston 130 coaxially thereof and having a large-diameter section 150a open in the end face of the small-diameter section 130a of the differential piston 130 and a small-diameter section 150b open in the end face of the large-diameter section 130b of the piston 130. In the second cylinder bore 150 is slidably received a second differential piston 152 having a large-diameter section 152a in slidable engagement with the large-diameter section 150a of the second cylinder bore 150 and a small-diameter section 152b in slidable engagement with the small-diameter section 150b of the cylinder bore 150. An axial throughhole or passage 154 is formed through the second differential piston. A valve seat 156 formed of an elastic seal ring is mounted on the second piston 152 around the end of the passage 150 adjacent the ball 134 so that, when the ball 134 is caused to move toward the first differential piston 130 as will be described in more detail hereinafter, the ball 134 makes a very close contact with the valve seat 156 to interrupt the communication between the small and large-diameter sections 128a and 128b of the cylinder bore 128, i.e., between the pressure inlet 124 and the outlet 126. When the hydraulic communication is interrupted in the manner described above, the cylinder bore 128 is divided into an inlet-side hydraulic chamber 124a in direct communication with the pressure inlet 124 and an outlet-side hydraulic chamber 126a in direct communication with the outlet 126, by the cooperation of the first differential piston 130, the second differential piston 152, the ball 134 and the valve seat 156.

Radial passages 158 are formed in the peripheral wall of the small-diameter section 152b of the second differential piston 152 adjacent to the end face of the section 152b to communicate the axial passage 154 with the radial exterior of the piston 152. Elastic seal rings 160 and 162 are provided between the large-diameter piston section 152a and the large-diameter cylinder section 150a and between the small-diameter piston section 152b and the small-diameter cylinder section 150b, respectively.

An annular groove 164 having side walls 164a and 164b is formed in the outer peripheral surface of the large-diameter section 130b of the first differential piston 130 for the reason to be discussed later.

The housing 122 further defines therein a third cylinder bore 166 having an axis substantially parallel with the axis of the first cylinder bore 128 and comprising large and small-diameter sections 166a and 166b with an annular shoulder 166c provided therebetween. Received slidably in the third cylinder bore 166 is a third differential piston 168 having a large-diameter section 168a in sliding contact with the large-diameter section 166a of the third cylinder bore 166 and a small-diameter section 168b in sliding contact with the small-diameter section 166b of the cylinder bore 166. The large-diameter section 168a of the third differential piston 168 consists of a rod portion 168a-1, which is integral with the small-diameter section 168b and has a diameter smaller than that of the section 168b, and a collar 168a-2 slidably mounted on the rod portion 168a-1. When the third differential piston 168 is displaced toward the small-diameter section 166b of the third cylinder bore 166, the collar 168a-2 is moved into engagement with the shoulder 166c of the cylinder bore 166 so that the collar is prevented from being further moved with the small-diameter section 168a and the rod portion 168a-1 of the piston 168. On the other hand, when the piston 168 is caused to move toward the large-diameter cylinder section 166a, the collar 168a-2 is moved in unison with the rod portion 168a-1 and the small-diameter section 168b of the piston 168 until the rod portion 168a-1 engages with an end wall 166a-1 of the large-diameter cylinder section 166a. Elastic seal rings 170 and 172 are provided between the rod portion 168a-1 of the differential piston 168 and the large-diameter section 166a of the cylinder bore 166 and between the small-diameter section 168b of the piston 168 and the small-diameter section 166b of the cylinder bore 166. The seal ring 170 is movable together with the collar 168a-2, the rod portion 168a-1 of the piston 168 being movable relative to the seal ring 170 within a limited range. In order to prevent the seal ring 170 and the collar 168a-2 from being removed from the rod portion 168a-1, the free end of the rod portion 168a-1 is provided with a flange 171.

A front hydraulic circuit pressure chamber 174 is defined within the large-diameter section 166a of the cylinder bore 166 between the end wall 166a-1 thereof and the large-diameter section 168a of the piston 168 and is connected through a second or front pressure inlet 176 to the conduit 114a of the front hydraulic circuit 114, the inlet 176 being formed in the housing 122. The front hydraulic pressure chamber 174 is also connected to the conduit 114b of the front hydraulic circuit 114 through a second or front pressure outlet 177 formed in the housing 122.

A rear hydraulic circuit pressure chamber 178 is defined within the small-diameter section 166b of the cylinder bore 166 between an end wall 166b-1 thereof and the small-diameter section 168b of the differential piston 168 and is connected through a rear pressure inlet 180 (which is formed in the housing 122) to a conduit 110c branched from the conduit 110a of the rear hydraulic circuit 110 so that the hydraulic pressure in the rear hydraulic circuit is introduced into the rear hydraulic chamber 178.

As described above, the hydraulic pressures from the front and rear hydraulic circuits 114 and 110 are exerted to the large and small-diameter sections 168a and 168b of the third differential piston 168. The collar 168a-2 of the large-diameter section 168a cannot be moved rightwards beyond the shoulder 166c in the cylinder bore 166. As a result, during the normal operation of the rear and front hydraulic circuits 110 and 114, the collar 168a-2 rests at a position (which is shown in FIG. 1 and will be called "normal position" hereinafter in this specification) in which the collar 168a-2 is in contact with both the shoulder 166c in the cylinder bore 166 and the shoulder 168c formed between the small-diameter section 168b and the rod portion 168a-1 of the differential piston 168.

An annular groove 182 is formed in the peripheral surface of the small-diameter section 168b of the differential piston 168 and has side walls 182a and 182b which converge axially toward each other and define therebetween a cylindrical surface 182c or bottom of the annular groove 182.

The housing 122 defines therein a further cylinder bore 184 having an axis which is perpendicular to the axis of the third cylinder bore 166 and included in a plane containing the midpoint between the ends of the bottom 182c of the annular groove 182. The cylinder bore 184 has a large-diameter section 184a open to the small-diameter section 166b of the cylinder bore 166 and a small-diameter section 148b open to the large-diameter section 128b of the first cylinder bore 128 with an annular shoulder 184c formed therebetween. Received slidably in the cylinder bore 184 is a plunger 186 having a large-diameter section 186a in sliding contact with the large-diameter cylinder section 184a, a lower small-diameter section or rod 186b, which may protrude through the small diameter section 184b of the cylinder bore 184 into the large-diameter section 128b of the first cylinder bore 128, and an upper small-diameter section or rod 186c which normally extend into the annular groove 182 in the differential piston 168. A compression spring 188 is provided between a shoulder or step 186d formed between the large-diameter plunger section 186a and the lower rod 186b of the plunger 186 and the shoulder or step 184c of the cylinder bore 184 so that the upper rod 186c of the plunger 186 is normally urged against the bottom 182c of the annular groove 182 of the differential piston 168. When the first differential piston 130 is placed in a position in which the projections 138 on the end face of the large-diameter section 130b of the piston 130 are engaged with the end wall 128b-1 of the large-diameter section 128b of the cylinder bore 128, the axis of the plunger 186 and thus the axis of the cylinder bore 184 are included in a plane which contains the midpoint between the side walls 164a and 164b of the groove 164 and are perpendicular to the axis of the first differential piston 130. Therefore, when the third differential piston 168 is displaced to the right or left from the normal position, the plunger 186 is lowered by the tapered side wall 182a or 182b of the annular groove 182 against the compression spring 188 so that the lower rod 186b of the plunger 186 is forced through the small-diameter section 184b of the cylinder bore 184 into locking engagement with the annular groove 164 of the first differential piston 130.

The housing 122 is further formed therein with an internally threaded bore 184 which is coaxial with the cylinder bore 184 and into which is screwed a switch part 192 which forms a part of an alarm device which gives an alarm signal in the event of leakage of brake fluid from either of the rear and front hydraulic circuits 110 and 114. The switch part 192 has a plunger 194 which normally extends into the annular groove 182 of the third differential piston 168 so as to be lifted by the tapered side wall 182a or 182b when the piston 168 is displaced from the normal position, thereby actuating a switch (not shown) within the switch part 192.

Figure 5:
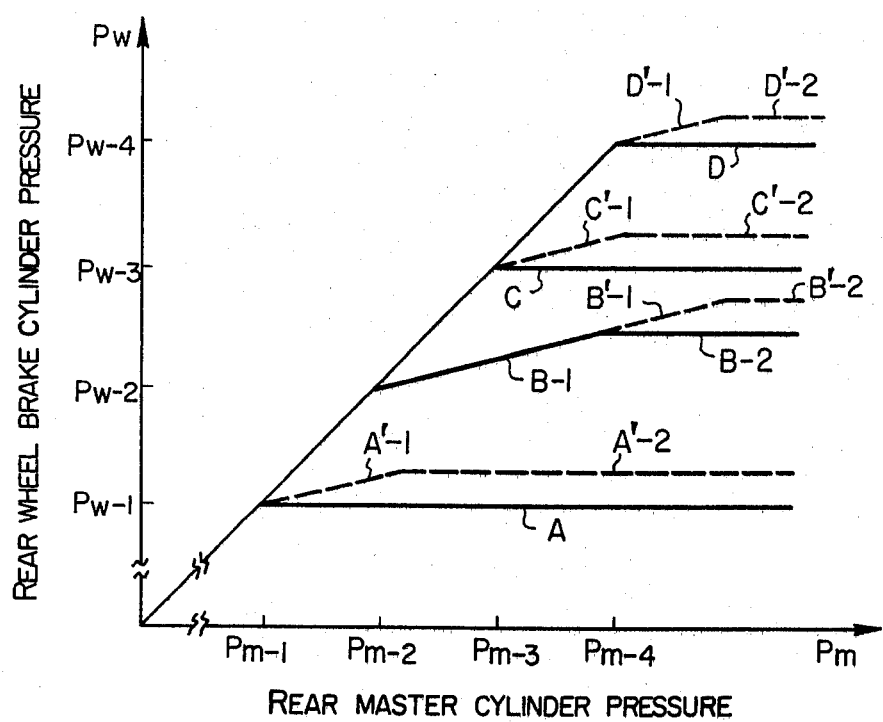
FIG. 5 graphically illustrates the operating characteristics of the embodiment shown in FIG. 1, the modification shown in FIG. 3 and the second embodiment shown in FIG. 4.

Referring to FIGS. 1 and 5, the operation of the first embodiment described above will be described. First, the normal (no leakage) operations of the front and rear hydraulic circuits 110 and 114 will be described. Upon depression of the brake pedal 102, the hydraulic pressure is admitted to both the front and rear hydraulic circuit pressure chambers 174 and 178, so that the differential piston 168 remains in the normal position, i.e., the position shown in FIG. 1. As a result, the plunger 186 remains in the position shown in FIG. 1, so that its lower rod 186b does not engage with the annular groove 164 of the first differential piston 130.

The hydraulic pressure is transmitted from the front pressure outlet port 108 of the tandem master cylinder 104 through the conduit 114a, the front pressure inlet port 176 of the hydraulic pressure control device 120, the hydraulic pressure chamber 174, the pressure outlet port 177 and the conduit 114b to the front wheel brake cylinders 116a and 116b, whereby braking efforts are applied to the front wheels. Similarly, the hydraulic pressure is also transmitted from the rear pressure outlet port 106 of the tandem master cylinder 104 through the conduit 110a, the rear pressure inlet port 124 of the hydraulic pressure control device 120, the cylinder bore 128, the first pressure outlet port 126 and the conduit 110b to the rear wheel brake cylinders 112a and 112b, whereby braking efforts are applied to the rear wheels.

The operations of the members within the cylinder bore 128 under the above conditions will be described. In the initial stage of braking immediately after the depression of the brake pedal 102, the rear wheel braking hydraulic pressure introduced through the rear or first pressure inlet 124 into the inlet-side hydraulic pressure chamber 124a and then flows through the passages 132a, the passage 154 in the differential piston 152 and the radial passages 158 at the end of the small-diameter section 152b of the differential piston 152 into the outlet-side hydraulic pressure chamber 126a and then to the outlet port 126. Therefore, hydraulic pressures of the same magnitude are exerted to both ends of the first and second differential pistons 130 and 152. However, the large-diameter section 152a of the second or inner differential piston 152 has a pressure receiving area which is larger than that of the small-diameter section 152b, the second differential piston 152 is forced against the end wall 128b-1 of the large-diameter section 128b of the first cylinder bore 128. As a result, after the hydraulic pressure has been admitted into the first cylinder bore 128 through the first inlet port 124, the distance from the end wall 128a-1 of the small-diameter section 128a of the first cylinder bore 128 to the valve seat 156 is fixed and maintained constant.

The smaller-diameter section 130a of the outer or first differential piston 130 adjacent to the inlet-side pressure chamber 124a has a pressure-receiving area which is smaller than that of the large-diameter section 130b adjacent to the outlet-side hydraulic pressure chamber 126a. As a result, although the same pressure (pressure per unit area) is exerted to both the small and large-diameter sections 130a and 130b, the force (not the "pressure") acting on the small-diameter section 130a is smaller than the force acting on the large-diameter section 130b. Consequently, the differential piston 130 tends to be moved toward the inlet 124 against the compression spring 142 by a force equal to the difference between the forces acting on the small and large-diameter sections 130a and 130b. However, the compression spring 142 is so selected that, under an unloaded condition of the vehicle, i.e., when the vehicle is carrying an operator only, the spring will not be compressed and deformed by the above-said differential force during application of braking efforts to the vehicle even at the maximum pressure within the rear hydraulic circuit 110. In other words, the compression spring 142 is so strong that, even when the motor vehicle running in unloaded condition is suddenly braked, the outer or first differential piston 130 is not permitted to move toward the inlet 124 against the spring 142. Thus, the flow of brake fluid produced by the depression of the brake pedal 102 can be utilized for the operation of the rear wheel brake cylinders 112a and 112b most effectively (that is, without the brake oil flow being consumed for the displacement of the differential piston 130 toward the inlet 124).

The braking hydraulic pressures applied to the front and rear wheel cylinders in the manner described above are gradually increased. When the deceleration of the vehicle reaches a predetermined value, the ball 134 is moved against the compression spring 136 to the right in FIG. 1 and is sealingly engaged with the valve seat 156. As a result, the inlet-side pressure chamber 124a is interrupted or disconnected from the outlet-side hydraulic pressure chamber 126a. Thereafter, even if the hydraulic pressure in the rear section of the master cylinder rises further, the hydraulic pressures in the rear wheel brake cylinders do not rise any more and are held at a predetermined level. This will be described in more detail with reference to the graphical illustration in FIG. 5. With the increase in the hydraulic pressure $Pm$ in the rear section of the master cylinder, the hydraulic pressure $Pw$ in the rear wheel brake cylinders also increases. When the pressure $Pw$ reaches $Pw$-1, the deceleration of the motor vehicle reaches the predetermined level and the ball 134 is moved into sealing engagement with the valve seat 156. At this time, the hydraulic pressure $Pm$ is at $Pm$-1. With any further increase in the pressure $Pm$, the hydraulic pressure $Pw$ in the rear wheel cylinders remains at the level $Pw$-1, as indicated by a straight line A. This condition continues until the motor vehicle is completely stopped.

Under a laded condition; that is, when the motor vehicle is carrying passengers and/or cargo in addition to the driver, the whole weight is larger than that in unladed condition, so that the inertia of the vehicle is greater than in unloaded condition. As a consequence, even when the hydraulic pressure $Pw$ in the rear wheel cylinders rises to $Pw$-1, the deceleration of the motor vehicle does not reach the above-said predetermined level, so that the ball 134 remains in the position shown in FIG. 1 and, consequently, the inlet-side hydraulic pressure chamber 124a is kept communicated with the oulet-side hydraulic pressure chamber 126a and thus with the rear wheel brake cylinders 112a and 112b. When the hydraulic pressure Pm in the rear master cylinder rises beyond $Pm$-1, the hydraulic pressure $Pw$ in the rear wheel brake cylinders also rises beyond $Pw$-1, with a result that the difference between the forces acting on the small and large-diameter sections 130a and 130b of the first differential piston 130 increases correspondingly and causes the differential piston 130 to move toward the left; that is, toward the pressure inlet 124 against the spring 142. When the piston 130 has been displaced a distance toward the left, the deceleration of the motor vehicle reaches the predetermined level, so that the ball 134 is forced to the right against the compression spring 136 and sealingly engaged with the valve seat 156 to interrupt the communication between the inlet-side and outlet-side pressure chambers 124a and 126a. At this moment, the hydraulic pressure $Pw$ in the rear wheel brake cylinders is at $Pw$-2, whereas the hydraulic pressure $Pm$ in the rear master cylinder is at $Pm$-2. With further increase in the hydraulic pressure $Pm$, the differential piston 130, which has been displaced to the left against the compression spring 142, is caused to move toward the right until the projections 138 on the end face of the large-diameter piston section 130b are engaged by the end wall 128b-1 of the large-diameter cylinder section 128b. As a result, the hydraulic pressure in the outlet-side hydraulic pressure chamber 126a and hence the pressure $Pw$ in the rear wheel brake cylinders are increased. However, the rate of the increase in the pressure $Pw$ after the ball 134 has been engaged with the valve seat 156 is dependent upon the ratio between the pressure receiving areas of the small and large-diameter sections 130a and 130b of the first differential piston 130 and is indicated by line B-1 in FIG. 5. It will be seen that the increase in the pressure $Pw$ in rear wheel brake cylinders after the hydraulic pressure $Pw$ exceeds $Pw$-2 is gentle as compared with the increase in the hydraulic pressure Pm in the region exceeding $Pm$-2, with a resultant advantageous decrease in risk that the rear wheel brakes will lock the rear wheels. After the projections 138 of the differential piston 130 have been moved into contact with the end wall 128b-1, the pressure $Pw$ is not increased any further, as indicated by straight line B-2.

Figure 2:
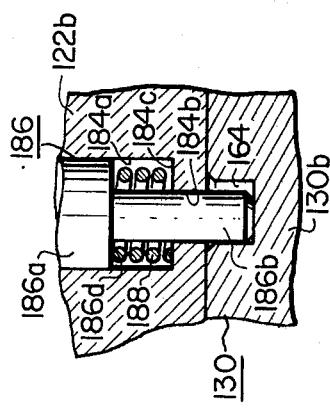
FIG. 2 is a fragmentary sectional view of a hydraulic pressure control device shown in FIG. 1, illustrating a plunger moved into locking engagement with a differential piston.

In the event where leakage of brake fluid occurred in the front hydraulic circuit 114, the hydraulic pressure in the front-circuit pressure chamber 174 in the third cylinder bore 166 is almost equal to zero or considerably lower than the pressure in the rear-circuit pressure chamber 178, so that the third differential piston 168 is caused to move to the left from the normal position shown in FIG. 1. As a result, the tapered side-wall 182b of the piston 168 pushes down the plunger 186 in the cylinder bore 184 so that the lower rod 186b of the plunger is forced into the annular groove 164 of the first differential piston 130, as shown in FIG. 2, to lock the first differential piston 130 against displacement in either direction. Simultaneously, the tapered side-wall 182b of the piston 168 pushes up the plunger 194 of the alarm switch part 192 so that the switch is actuated to give a brake-fluid leakage signal to the driver.

In the case of the brake fluid leakage from the front hydraulic circuit 114, the front wheel brakes are almost inoperable and the deceleration of the vehicle relies solely upon the braking efforts produced by the rear wheel brakes (this accidental state is called "rear partial"). By the time the deceleration of an unloaded vehicle reaches the predetermined level; that is, the deceleration at which the ball 134 is moved into sealing engagement with the valve seat 156, the hydraulic pressure $Pm$ in the rear section of the master cylinder rises up to $Pm$-3 while the hydraulic pressure $Pw$ in the rear wheel brake cylinders rises up to $Pw$-3 which is higher than $Pw$-2. However, because the piston 130 is locked by the plunger 186 against movement, the flow of brake fluid caused in the rear hydraulic circuit 110 by the operation of the brake pedal 102 is used most efficiently and exclusively for driving the pistons within the rear wheel brake cylinders 112a and 112b without being consumed for any leftward movement of the differential piston 130. After the ball 134 is moved into sealing engagement with the valve seat 156 to interrupt the communication between the inlet and outlet-side pressure chambers 124a and 126a in the hydraulic pressure control device 120, any further increase in the hydraulic pressure $Pm$ in the rear section of the master cylinder cannot move the differential piston 130 rightward because the piston is locked by the plunger 186 (and the projections 138 on the piston 130 are also engaged by the cylinder end wall 128b-1). Accordingly, the hydraulic pressure $Pw$ in the rear wheel brake cylinders will be maintained at $Pw$-3, as indicated by straight line C in FIG. 5.

In the case of "rear partial" operation of the brake apparatus with the vehicle being in loaded condition, the inertia of the total of the vehicle and the load thereon is greater than in the case of the vehicle being in unloaded state. Thus, by the time when the deceleration of the vehicle reaches the above-said predetermined value, the hydraulic pressures $Pm$ and $Pw$ in both of the rear section of the master cylinder and the rear wheel brake cylinders rise up to $Pm$-4 and $Pw$-4, respectively, which are higher than $Pm$-3 and $Pw$-3, respectively. Because of the reasons discussed above in connection with the "rear partial" braking operation with unloaded vehicle, the hydraulic pressure $Pw$ in the rear wheel brake cylinders is not increased any further but kept at a constant level Pw-4 even if the hydraulic pressure Pm in the rear section of the master cylinder further rises beyond Pm-4.

Figure 3:
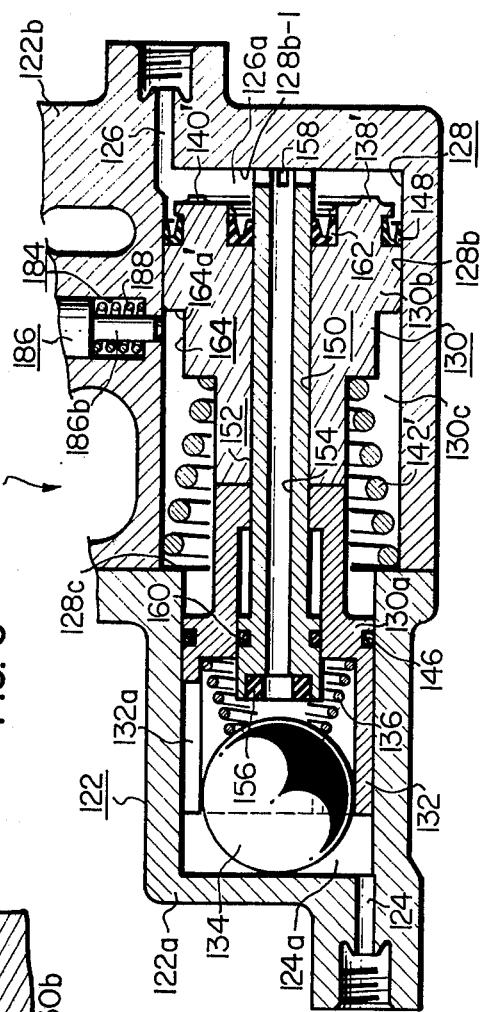
FIG. 3 is a fragmentary sectional view of a modified hydraulic pressure control device.

Referring now to FIG. 3, there is shown a modification of the first preferred embodiment shown in FIG. 1. Parts of the modification similar to those shown in FIG. 1 are designated by similar reference numerals. The difference from the first embodiment will be described below.

The large-diameter section 130b of the first differential piston 130 which is slidably received in the first cylinder bore 128 of the hydraulic pressure control device 120 is formed with a step portion 164 instead of the annular groove 164 (FIG. 1). The step has a side wall 164a' only at one side thereof. The other side of the step is open to the annular groove 130c in which is disposed a conical-helical compression spring 142' having its large-diameter end abutted against the shoulder or step 128c provided between the large and small-diameter sections 128b and 128a of the cylinder bore 128, the small-diameter end of the spring 142' abutting against the right side wall of the annular groove 130c. Projections 138' extending from the end face of the large-diameter section 130b of the piston 130 are shorter than the projections 138 in the first embodiment shown in FIG. 1 so that, when the differential piston 130 is moved to a position in which the side wall 164a' of the annular step portion 164' engages with the lower rod 186b of the plunger 186, the projections 138' are spaced apart from the end wall 128b-1 of the large-diameter cylinder section 128b toward the left, i.e., toward the pressure inlet 124. In order to facilitate mounting of the compression spring 142' on the first differential piston 130, the small and large-diameter sections 130a and 130b are prepared separately or independently and merely abutted against each other as shown at the midpoint of the annular groove 130c (they do not need to be rigidly secured together).

With further reference to the graph shown in FIG. 5, the mode of operation of the modification will be described. Assuming that the rear and front hydraulic circuits are operable normally and the vehicle is in unloaded condition, when the hydraulic pressure Pm in the rear section of the master cylinder rises to Pm-1, the hydraulic pressure Pw in the rear wheel brake cylinders rises to Pw-1 and the deceleration of the vehicle reaches a predetermined level, so that the ball 134 is moved into sealing engagement with the valve seat 156. With further increase in the hydraulic pressure Pm in the rear section of the master cylinder, the hydraulic pressure Pw in the rear wheel brake cylinders increases at a rate which is dependent upon the ratio between the pressure receiving areas of the small and large-diameter sections 130a and 130b of the first differential piston 130. The pressure increase is indicated by broken line A'-1. After the projections 138' on the large-diameter piston section 130b are engaged with the end wall 128b-1 of the large-diameter cylinder section 128b, the hydraulic pressure Pw will not be increased but maintained at a constant level, as indicated by broken line A'-2, despite of any further increase in the pressure Pm. With the vehicle in loaded condition, the piston 130 is displaced toward the pressure inlet 124 against the compression spring 142' before the hydraulic pressure Pw in the rear wheel brake cylinders reaches Pw-2 and, when the pressure Pw reaches Pw-2, the deceleration of the vehicle reaches a predetermined level so that the ball 134 is displaced into sealing engagement with the valve seat 156. Thereafter, with further increase in the pressure Pm, the hydraulic pressure Pw in the rear wheel brake cylinders increases at the same rate with that of the line A'-1, as indicated by solid straight line B-1 in FIG. 5. Since the projections 138' are shorter than the projections 138 (See FIG. 1), the hydraulic pressure Pw further increases as indicated by broken line B'-1 beyond the pressure level B-2 until the projections 138' are abutted against the cylinder end wall 128b-1. Thereafter, the pressure Pw is no more increased but maintained at a constant level, as indicated by broken line B'-2 even though the hydraulic pressure Pm in the rear section of the master cylinder increases further.

In the case of "rear partial" operating condition of the brake apparatus, the lower rod 186b of the plunger 186 protrudes into the cylinder bore 128 and is engaged with the side wall 164a' of the annular step portion 164' on the first differential piston 130 so that any leftward movement of the piston 130 from the position shown in FIG. 3 is no longer permissible. As a result, increase in the hydraulic pressure Pm in the rear section of the master cylinder results in the increase in the hydraulic pressure Pw in the rear wheel brake cylinders in the manner indicated by broken lines C'-1 and C'-2 (under unloaded condition of vehicle) and by broken lines D'-1 and D'-2 (under loaded condition of vehicle). These characteristic lines C'-1 to D'-2 are similar to those A'-1 and A'-2 (in normal braking operation with the vehicle unloaded) with the exception that the lines C'-1 and D'-1 start from pressure values of Pw-3 and Pw-4, respectively. Thus, any further description in this concern will not be required.

Figure 4:
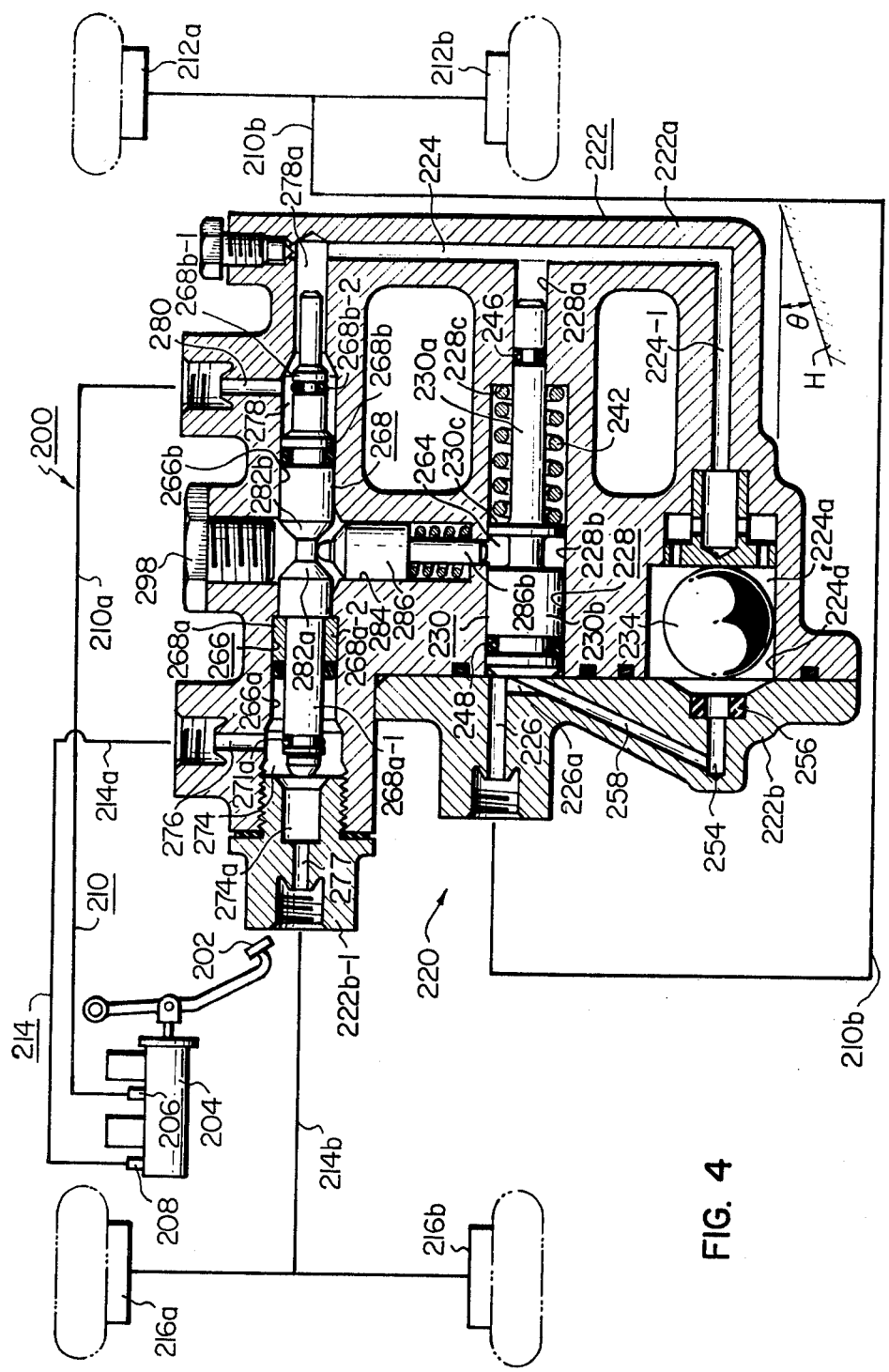
FIG. 4 is a view similar to FIG. 1 but illustrates a second embodiment of the present invention.

FIG. 4 illustrates a second embodiment of a vehicular hydraulic brake apparatus in accordance with the present invention. The apparatus is generally designated by reference numeral 200 and has a tandem master cylinder 204 having a front section (not shown) communicated through a front pressure outlet 208 and through a front hydraulic circuit 214 with front wheel brake cylinders 216a and 216b. A rear section (not shown) of the tandem master cylinder 204 is communicated through a rear pressure outlet 206 and through a rear hydraulic circuit 210 with rear wheel brake cylinders 212a and 212b.

Disposed in the front and rear hydraulic circuits 214 and 210 is a hydraulic pressure control device generally designated by reference numeral 220. The control device 220 comprises a housing 222 consisting of a pair of housing parts 222a and 222b which are secured together. The housing 222 has a front pressure inlet 276, a front pressure outlet 277, a rear pressure inlet 280 and a rear pressure outlet 226. The front hydraulic circuit 214 comprises a first conduit 214a interconnecting the front pressure outlet 208 in the tandem master cylinder 204 and the front pressure inlet 276 in the housing 222 and a second conduit 214b interconnecting the front pressure outlet 277 in the housing 222 and the front wheel brake cylinders 216a and 216b. The rear hydraulic circuit 210 comprises a first conduit 210a interconnecting the rear pressure outlet 206 in the tandem master cylinder 204 and the rear pressure inlet 280 in the housing 222 and a second conduit 210b interconnecting the rear pressure outlet 226 in the housing 222 and the rear wheel brake cylinders 212a and 212b.

Formed within the housing 222 are a front hydraulic pressure chamber 274 communicating the front pressure inlet 276 with the front pressure outlet 277, and a rear hydraulic pressure chamber 278 in direct communication with the rear pressure inlet 280. A cylinder bore 266 extends between the front and rear hydraulic pressure chambers 274 and 280. The cylinder bore has a large-diameter section 266a, which defines the front hydraulic pressure chamber 274, and a small-diameter section 266b defining the rear hydraulic pressure chamber 278. A passage 278a is formed in the housing 222 coaxially with the cylinder bore 266 and connected at one end to the end of the small-diameter cylinder section 266b remote from the large-diameter section 266a. The other end of the passage 278a is connected to one or the upper end of a passage 224 which is substantially perpendicular to the passage 278a.

The other or lower end of the passage 224 is connected to a passage 224-1 having an axis substantially parallel with the axis of the cylinder bore 266. A second cylinder bore 228 extends substantially in parallel with the first cylinder bore 266 between the rear pressure outlet 226 and the intermediate point of the passage 224. The second bore 228 has a large-diameter section 228b in direct communication with an outlet-side rear pressure chamber 226a, which is continuous with the inner end of the rear pressure outlet 226, and a small-diameter section 228a in direct communication with the passage 224. Slidably received in the second cylinder bore 228 is a differential piston 230 comprising a small-diameter section 230a slidably fitted in the small-diameter cylinder section 228a and a large-diameter section 230b slidably fitted into the large-diameter cylinder section 228b. A compression spring 242 extends between a step or shoulder 230c formed between the small and large-diameter sections 230a and 230b of the differential piston 230 and a step or shoulder 228c between the small and large-diameter sections 228a and 228b of the second cylinder bore 228 so that the differential piston 230 is normally biased toward the outlet-side rear pressure chamber 226a. The large-diameter section 230b of the differential piston 230 is formed with an annular groove 264. Elastic seal rings 246 and 248 are provided between the small-diameter cylinder and piston sections 228a and 230a and between the large-diameter cylinder and piston sections 228b and 230b.

The end of the passage 224-1 remote from the lower end of the passage 224 is connected to a chamber 224a which in turn is communicated through a passage 254 and an inclined passage 258 with the outlet-side rear pressure chamber 226a. An annular valve seat 256 of an elastic material is provided around the opening of the passage 254 to the chamber 224a so that the valve seat 256 is sealingly engaged by a ball 234 placed in the chamber 224a. When braking efforts are applied to an associated vehicle to an extent where the deceleration of the vehicle reaches a predetermined value, the ball 234 is moved into sealing engagement with the valve seat 256 to interrupt the communication between the passages 224-1 and 254 and thus between the rear pressure outlet 206 of the rear section of the master cylinder 204 and the rear wheel brake cylinders 212a and 212b. The hydraulic pressure control device 220 is mounted on the chassis (not shown) of the vehicle such that the bottom 224a' of the chamber 224a is inclined at an angle θ forwardly upwardly relative to the horizontal H. This inclination sets the above-mentioned predetermined deceleration.

Slidably housed in the cylinder bore 266 is a differential piston 268 which is substantially similar in structure to the differential piston 168 shown in FIG. 1. Thus, the parts of the piston 268 similar to those of the piston 168 are designated by similar reference numerals added by 100. The difference will mainly be described hereunder.

A seal ring 271a is mounted in an annular groove formed in the outer peripheral surface of a rod portion 268a-1 which is a part of a large-diameter section 268a of the piston 268.

A plug 222b-1 is screwed into an internally threaded hole formed in the housing part 222b and forms the outer end wall of the front pressure chamber 274. The front pressure outlet 277 extends through the plug 222b-1 coaxially thereof. Also formed in the inner end of the plug 222b-1 is an axial hole 274a for receiving the rod 268a-1 of the piston 268 when the latter is moved leftwards. The inner diameter of the hole 274a is so determined that the seal ring 271a on the rod 268a sealingly engages with the inner peripheral surface of the hole 274a to block the front hydraulic circuit 214.

The small-diameter section 268b of the differential piston 268 has a coaxial rod-shaped extension 268b-1 having an annular groove in which a seal ring 268b-2 is mounted. The extension 268b-1 has such a diameter that the extension can be received in the passage 278a with the seal ring 268b-2 in slidable sealing engagement with the inner peripheral wall of the passage 278a to block the rear hydraulic circuit 210.

A plunger 286 is slidably received in a third cylinder bore 284 extending between the first and second cylinder bores 226 and 228. The cylinder bore 284 and the plunger 286 are similar in structure to the cylinder bore 184 and the plunger 186 shown in FIG. 1. Thus, parts of the cylinder bore 284 and the plunger 286 similar to those of the cylinder bore 184 and the plunger 186 are designated by similar reference numerals added by 100. The plunger 286 has an operative relationship with the differential piston 268 similar to the relationship between the plunger 186 and the differential piston 168. The plunger 286 has a rod-shaped projection or small-diameter section 286b for locking engagement with the annular groove 264 in the differential piston 230.

The second embodiment described is not provided with such a switch part of alarm means as is provided in the first embodiment. The upper end of the cylinder bore 284 is closed by a plug 298. This plug, however, can be replaced by an alarm switch part as in the first embodiment.

The operation of the second embodiment of the invention is substantially similar to that of the first embodiment described with reference to the graphical illustration in FIG. 5. Namely, when the front and rear hydraulic circuits 214 and 210 are both normally operable (i.e., without any brake fluid leakage) and the vehicle is in unloaded condition, the hydraulic pressure from the front pressure outlet 208 of the tandem master cylinder is transmitted through the conduit 214a, the front pressure chamber 274 and the conduit 214b to the front wheel brake cylinders 216a and 216b to actuate them. Similarly, the hydraulic pressure from the rear pressure outlet 206 of the tandem master cylinder 204 is transmitted through the conduit 210a, the inlet-side rear pressure chamber 278, the passages 278a, 224 224-1 into the chamber 224a from which the pressure is transmitted through the passages 254 and 258, the outlet-side rear pressure chamber 226a and the conduit 210 to the rear wheel brake cylinders 212a and 212b to actuate them.

When the deceleration reaches a predetermined level, the ball 234 is caused to roll on the inclined between 224a' of the chamber 224a and sealingly engaged with the valve seat 256, so that even if the hydraulic pressure in the rear section of the tandem master cylinder 204 is further increased, the hydraulic pressure in the rear wheel brake cylinders do not increase (as indicated by the straight line A in FIG. 5).

Under loaded condition of the vehicle, the piston 230 is forced to move rightwards in the cylinder bore 228 against the compression spring 242 before the deceleration reaches the above-said predetermined level. Then, the ball 234 is moved into engagement with the valve seat 256 when the deceleration has reached the predetermined level. Thereafter, with further increase in the pressure P*m* in the rear section of the master cylinder, the piston 230 is caused to move leftwards in the cylinder bore 228. This operation can be shown by lines B-1 and B-2 in FIG. 5.

In the case of "rear partial" operation of the brake apparatus, namely, when leakage occurred in the front hydraulic circuit 214, the differential piston 268 is forced leftwards due to the difference in pressure between the pressure chambers 274 and 278, so that the rod-shaped projection 286*b* of the plunger is forced into the annular groove 264 in the differential piston 230 to lock the piston against movement in either direction. By the time when the deceleration reaches the predetermined level and the ball 234 closes the valve seat 256 in accordance with the inertia of the vehicle under loaded or unloaded condition, the hydraulic pressure in the rear wheel cylinders increases up to P*w*-3 or P*w*-4 with the increase in the pressure in the rear section of the master cylinder. After the closure of the valve seat 256 by the ball 234, however, the hydraulic pressure P*w* in the rear wheel brake cylinders is not increased beyond P*w*-3 or P*w*-4 but maintained at a constant value (as indicated by line C or D in FIG. 5).

As described above, the vehicular hydraulic brake apparatus according to the present invention is operative such that, if brake fluid leakage should occur in the front hydraulic circuit 114 or 214, the differential piston 168 or 268 is operative in response to the brake fluid leakage to move the rod-shaped projection 186*b* or 286*b* of the plunger 186 or 286 into locking engagement with the annular groove 164 or 264 or stepped portion 164' of the first differential piston 130 or 230. As a result, the movement of the differential piston 130 or 230 at least toward the pressure inlet 124 or 224 of the hydraulic pressure control device 120 or 220 is not permitted, with a resultant advantage that the operation of the brake pedal throughout its entire stroke can be most efficiently used exclusively for the driving of the pistons in the rear wheel brake cylinders. Thus, brake pedal operation over a small stroke may be sufficient to obtain a high pressure in the rear wheel brake cylinders.

What is claimed is:

1. A vehicular hydraulic brake apparatus comprising a tandem master cylinder having front and rear sections, front and rear wheel brake cylinders, independent front and rear wheel braking hydraulic circuits connecting the front and rear sections of said master cylinder to the front and rear wheel brake cylinders, respectively, and deceleration responsive braking pressure control means disposed in one of said front and rear wheel braking hydraulic circuits and having pressure inlet and outlet normally communicated with each other, said braking pressure control means including deceleration responsive valve means and a differential piston both disposed between said pressure inlet and outlet, said valve means being responsive to a predetermined deceleration of a vehicle to interrupt the communication between said pressure inlet and outlet, said differential piston having a first pressure receiving area exposed to the hydraulic pressure at said pressure inlet and a second pressure receiving area larger than said first pressure receiving area and exposed to the hydraulic pressure at said pressure outlet, and means responsive to a difference in pressure between said master cylinder front and rear sections for locking said differential piston against movement at least in the upstream direction.

2. The brake apparatus according to claim 1, wherein said deceleration responsive valve means and said differential piston are disposed in said rear wheel braking hydraulic circuit, and wherein said piston locking means include a second differential piston having a first pressure receiving area exposed to the hydraulic pressure in said front wheel braking hydraulic circuit and a second pressure receiving area smaller than said first pressure receiving area of said second differential piston and exposed to the hydraulic pressure in said rear wheel braking circuit, said second differential piston being normally stationary at a fixed position and movable in response to a difference in pressure between said master cylinder front and rear sections, and a locking member movable into engagement with the first-said differential piston when said second differential piston is moved from said fixed position.

3. The brake apparatus according to claim 2, wherein the first-said differential piston is formed thereon with an abutment means for engagement with said locking member, and wherein said second differential piston has an axis substantially parallel to the axis of the first-said differential piston and cam means formed on said second differential piston, said locking member comprising a plunger having one end disposed adjacent to said cam means for engagement thereby, said cam means being operative to urge said plunger into locking engagement at the other end with said abutment on the first-said differential piston when said second differential piston is moved from said fixed position.

4. The brake apparatus according to claim 3, wherein said second differential piston has first and second sections providing said first and second pressure receiving areas of said second differential piston, respectively, said first section comprising a rod-like part integral with said second section and having a diameter smaller than that of said second section, an annular shoulder formed between said first and second sections and an annular member mounted on said rod-like part for limited sliding movement thereon.

5. The brake apparatus according to claim 4, wherein an annular groove is formed in the peripheral surface of said second section of said second differential piston and has side walls tapered toward each other, the tapered walls providing said cam means.

6. The brake apparatus according to claim 3, wherein an annular groove is formed in the periphery of the first-said differential piston and has side walls which provide said abutment means.

7. The brake apparatus according to claim 3, wherein an annular shoulder is formed on the periphery of the first-said differential piston and provides said abutment means.

8. The brake apparatus according to claim 1, wherein said piston locking means include second valve means disposed in said front and rear wheel braking hydraulic circuits, respectively, said second valve means being operative in response to a difference in pressure between said master cylinder front and rear sections to block one of said front and rear wheel braking hydraulic circuits.

9. The brake apparatus according to claim 8, wherein said deceleration responsive valve means and said differential piston are disposed in one of said front and rear wheel braking hydraulic circuits, and wherein said piston locking means include a second differential piston having a first pressure receiving area exposed to the hydraulic pressure in said one braking hydraulic circuit and a second pressure receiving area smaller than said first pressure receiving area of said second differential piston and exposed to the hydraulic pressure in the other braking hydraulic circuit, said second differential piston being normally stationary at a fixed position and movable in response to a brake fluid leakage in anyone of said front and rear wheel braking hydraulic circuits, and a locking member movable into engagement with the first-said differential piston when said second differential piston is moved from said fixed position, said second valve means including valve seats provided in said front and rear wheel braking hydraulic circuits, respectively, and valve elements on said second differential piston and movable therewith into sealing engagement with said valve seats, the arrangement being such that said second differential piston is movable toward the valve seat in the braking hydraulic circuit in which a leakage has occurred so that the last-mentioned valve seat is engaged by an associated valve element.

10. The brake apparatus according to claim 9, wherein said second differential piston is movably housed in a cylinder defined in said deceleration responsive braking pressure control means and has first and second parts providing said first and second pressure receiving areas of said second differential piston, respectively, said cylinder defining first and second cylinder sections in which said first and second differential piston parts are slidably received, said first and second cylinder sections being connected through pressure intake ports to said master cylinder front and rear sections, respectively, said valve elements being provided on said first and second differential piston parts, respectively, and wherein said deceleration responsive braking pressure control means further define therein pressure outlets substantially coaxial with said cylinder and open to said first and second cylinder sections, respectively, said pressure outlets defining said valve seats, respectively.

* * * * *